United States Patent [19]

Tsuchiya

[11] Patent Number: 4,567,536
[45] Date of Patent: Jan. 28, 1986

[54] ADAPTER FOR A MINIATURE TYPE TAPE CASSETTE

[75] Inventor: Eiichi Tsuchiya, Yokohama, Japan

[73] Assignee: Victor Company of Japan, Ltd., Yokohama, Japan

[21] Appl. No.: 495,808

[22] Filed: May 18, 1983

[30] Foreign Application Priority Data

May 31, 1982 [JP] Japan .............................. 57-80452[U]
May 31, 1982 [JP] Japan .............................. 57-80453[U]

[51] Int. Cl.$^4$ ............................................. G11B 15/66
[52] U.S. Cl. ...................................... 360/94; 360/93; 360/85; 360/96.5; 360/132; 242/199
[58] Field of Search ..................... 360/132, 85, 94, 93, 360/96.5; 242/199, 198

[56] References Cited

U.S. PATENT DOCUMENTS

4,452,407 1/1984 Ogata et al. ..................... 242/198
4,470,560 9/1984 Yoneya et al. ................... 242/198
4,477,850 10/1984 Ogata et al. ..................... 360/94
4,494,161 1/1985 Ogata et al. .................... 360/132

Primary Examiner—Stuart N. Hecker
Assistant Examiner—Alfonso Garcia
Attorney, Agent, or Firm—Louis Bernat

[57] ABSTRACT

An adapter for a miniature type tape cassette comprises an adapter case having an external form an size substantially identical to those of the standard type tape cassette, an accommodating part for accommodating the miniature type tape cassette, and a tape draw-out mechanism provided within the adapter case, for drawing out the tape from the miniature type tape cassette so as to form a predetermined tape path within the adapter case. The tape draw-out mechanism comprises tape draw-out members relatively entering on an inner side of the tape path along the front of the cassette case when accommodating the miniature type tape cassette within the accommodating part, and a manipulation part for operating the tape draw-out members so as to form the predetermined tape path within the adapter. The manipulation part projects outside the adapter case to such an extent that the manipulation part hits an inserting part of the standard type recording and/or reproducing apparatus and prevents insertion of the adapter before and during manipulation of the manipulation part, and recedes within the adapter case to permit insertion of the adapter after manipulation of the manipulation part is completed.

8 Claims, 14 Drawing Figures

ADAPTER FOR A MINIATURE TYPE TAPE CASSETTE

BACKGROUND OF THE INVENTION

The present invention generally relates to adapters for miniature type tape cassettes, and more particularly to an adapter for use with a miniature type tape cassette which has a size smaller than a standard type tape cassette and is loaded independently into a recording and/or reproducing apparatus of a type different from a standard type recording and/or reproducing apparatus.

Presently, video signal recording and/or reproducing apparatuses using tape cassettes are reduced to practical use on the world-wide basis. As types of these recording and/or reproducing apparatuses using tape cassettes, two or three standardized types of apparatuses presently exist world-widely. There is no interchangeability between apparatuses of different standards, however, the interchangeability exists between apparatuses adopting the same standard. Accordingly, a tape cassette recorded by one recording and/or reproducing apparatus can be reproduced by another recording and/or reproducing apparatus of the same standard. Hence, in order to ensure the interchangeability between different recording and/or reproducing apparatuses manufactured by different manufacturers so as to perform recording and/or reproduction, a standardization is established with respect to formats of the tape cassette and the recording and/or reproducing apparatus. That is, the above formats are standardized for each standard, and a standard type tape cassette and a standard type recording and/or reproducing apparatus are respectively manufactured and marketed under each standard.

Recently, a problem of much importance involves the realization in downsizing the recording and/or reproducing apparatus main body. This is to develop a more compact portable type recording and/or reproducing apparatus, and, for example, to realize such an equipment that a recording apparatus is unitarily built into a television camera.

Accordingly, in order to downsize the recording and/or reproducing apparatus without changing the formats of the tape cassette and the recording and/or reproducing apparatus, a miniature type tape cassette was proposed in a U.S. patent application Ser. No. 322,174 now abandoned entitled "MINIATURE TYPE TAPE CASSETTE" filed Nov. 17, 1981 in which the assignee is the same as that of the present application. This proposed miniature type tape cassette has a size smaller than the standard type tape cassette, and is loaded independently into a recording and/or reproducing apparatus of a type different from the standard type recording and/or reproducing apparatus which carried out recording and reproduction when loaded with the standard type tape cassette. Further, an adapter for a miniature type tape cassette was proposed in a U.S. patent application Ser. No. 322,767 entitled "ADAPTER FOR A MINIATURE TYPE TAPE CASSETTE" filed Nov. 19, 1981 in which the assignee is the same as that of the present application. The proposed adapter has an external form and size identical to the standard type tape cassette. This proposed adapter is designed so as to accommodate the miniature type tape cassette therein, and is loaded into the standard type recording and/or reproducing apparatus in a state where a tape is drawn out of a cassette case of the miniature type tape cassette to form a predetermined tape path within the adapter.

In the above proposed adapter for the miniature type tape cassette, a loading manipulation lever and a cover for covering this manipulation lever are provided at the rear of the adapter case. After the miniature type tape cassette is accommodated within this adapter, the above cover is opened to enable manipulation of the manipulation lever. By carrying out a series of operation in which the manipulation lever is rotationally manipulated and the cover is thereafter closed, the predetermined tape path is formed within the adapter. The adapter is loaded into the standard type recording and/or reproducing apparatus in this state where the predetermined tape path is formed within the adapter.

However, in the proposed adapter for the miniature type tape cassette, the manipulation lever is receded within the adapter case both before the manipulation lever is manipulated and after the manipulation of the manipulation lever is completed. As a result, the adapter may be loaded into the standard type recording and/or reproducing apparatus in a state before the manipulation lever is manipulated. Further, it is impossible to determine the state of the tape path within the adapter, that is, whether the predetermined tape path has been formed within the adapter from outside the adapter. Accordingly, the adapter may be erroneously loaded into the standard type recording and/or reproducing apparatus in a state where the miniature type tape cassette is merely accommodated within the adapter and the manipulation lever has not been manipulated to form the predetermined tape path within the adapter. If the adapter is erroneously loaded into the standard type recording and/or reproducing apparatus in this state, the tape loading mechanism of the recording and/or reproducing apparatus cannot intercept and engage the tape. Thus, the tape loading mechanism cannot load the tape within the recording and/or reproducing apparatus, and the picture will not be reproduced on the television receiver no matter how long the operator waits. Such a situation may not be readily understood by the operator, and the operator may think that the apparatus is out of order.

In addition, in the proposed adapter, the cover must first be opened before manipulating the manipulation lever and closed thereafter in order to form the predetermined tape path within the adapter. However, such manipulation of the cover was trouble some to perform.

SUMMARY OF THE INVENTION

Accordingly, it is a general object of the present invention to provide a novel and useful adapter for a miniature type tape cassette, in which the above described problems have been eliminated.

Another and more specific object of the present invention is to provide an adapter for a miniature type tape cassette, which has a manipulation part for operating a tape draw-out member so as to form a predetermined tape path within an adapter case, and the manipulation part is designed to project outside the adapter case before and during manipulation of the manipulation part and recede within the adapter case when the manipulation of the manipulation part is completed. According to the adapter of the present invention, if an attempt is made to load the adapter into a standard type recording and/or reproducing apparatus in a state where the predetermined tape path is not formed within the adapter case, the manipulation part projecting outside the adapter case will hit a part of the recording and/or reproducing apparatus and prevent erroneous loading of the adapter.

Other objects and further features of the present invention will be apparent from the following detailed description when read in conjunction with the accompanying drawings.

DETAILED DESCRIPTION

Figure 1:
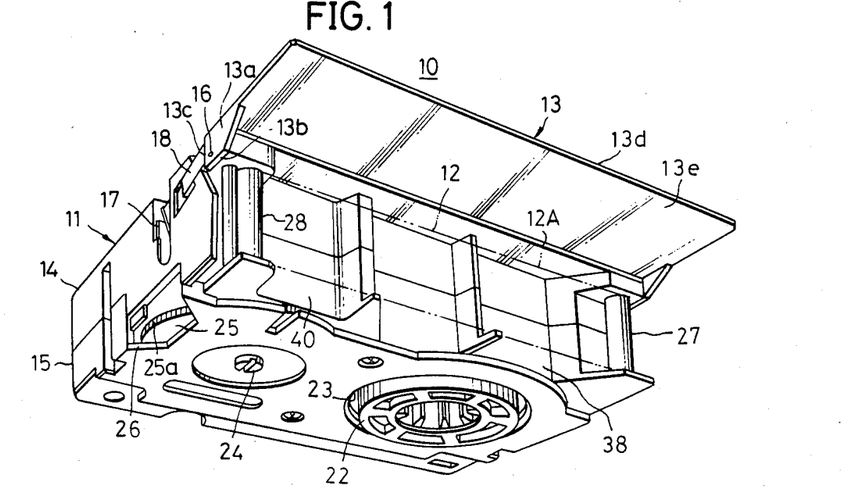
FIG. 1 is a perspective view showing an example of a miniature type tape cassette which is accommodated within an adapter for a miniature type tape cassette according to the present invention, in a state where a tape protecting lid is open, viewed from a lower direction with respect to the front of the miniature type tape cassette.
Figure 2A:
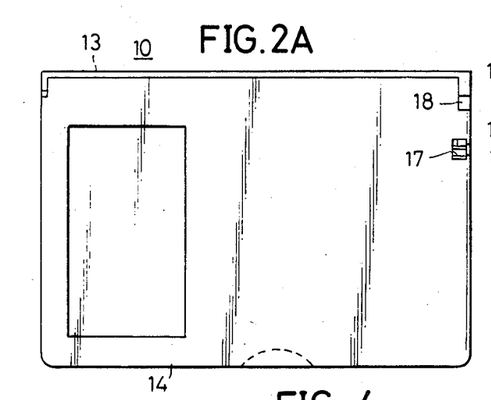
FIGS. 2A and 2B are a plan view and a side view respectively showing the miniature type tape cassette shown in FIG. 1.
Figure 2B:
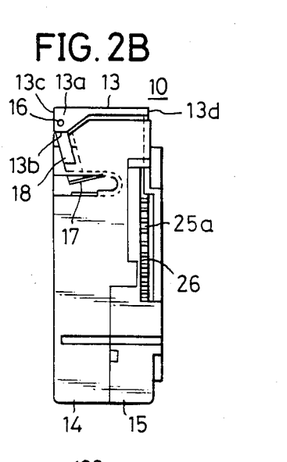

A miniature type tape cassette 10 has a configuration shown in FIGS. 1, 2A, and 2B. The tape cassette 10 has a cassette case 11 of a size smaller than a standard type tape cassette which is designed for a standard type recording and/or reproducing apparatus. A tape protecting lid 13 for protecting a magnetic tape 12 accommodated within the tape cassette 10, is provided on the front of the cassette case 11. In FIG. 1, the magnetic tape 12 is indicated by a two-dot chain line. The cassette case 11 consists of an upper half 14 and a lower half 15.

Side flanges 13a are integrally formed on both ends of the lid 13, and respective portions of the flanges are axially supported by corresponding hinge pins 16 (only one shown) in the vicinity of respective corner parts of the upper half 14, so that the lid 13 is rotatable to open and close. A substantially U-shaped leaf spring 17 and a slide rod 18 which is urged towards one of the hinge pins 16 by the leaf spring 17, are provided in relation to the above lid 13. The lid 13 is angularly rotatable about the hinge pins 16, and can assume two states. That is, in one state, one side edge 13b of the side flange 13a is pushed by the slide rod 18 and the lid 13 is in a closed state shown in FIG. 2B, and in another state, another side edge 13c of the side flange 13a is pushed by the slide rod 18 and the lid 13 is in an open state shown in FIG. 1. When the tape cassette 10 is not loaded into a recording and/or reproducing apparatus which will be described hereinafter designed exclusively for the tape cassette 10 or accommodated within a tape cassette adapter, the lid 13 covers the front of the cassette case 11 to protect the magnetic tape 12 which is exposed at the front of the cassette case 11.

Figure 3:
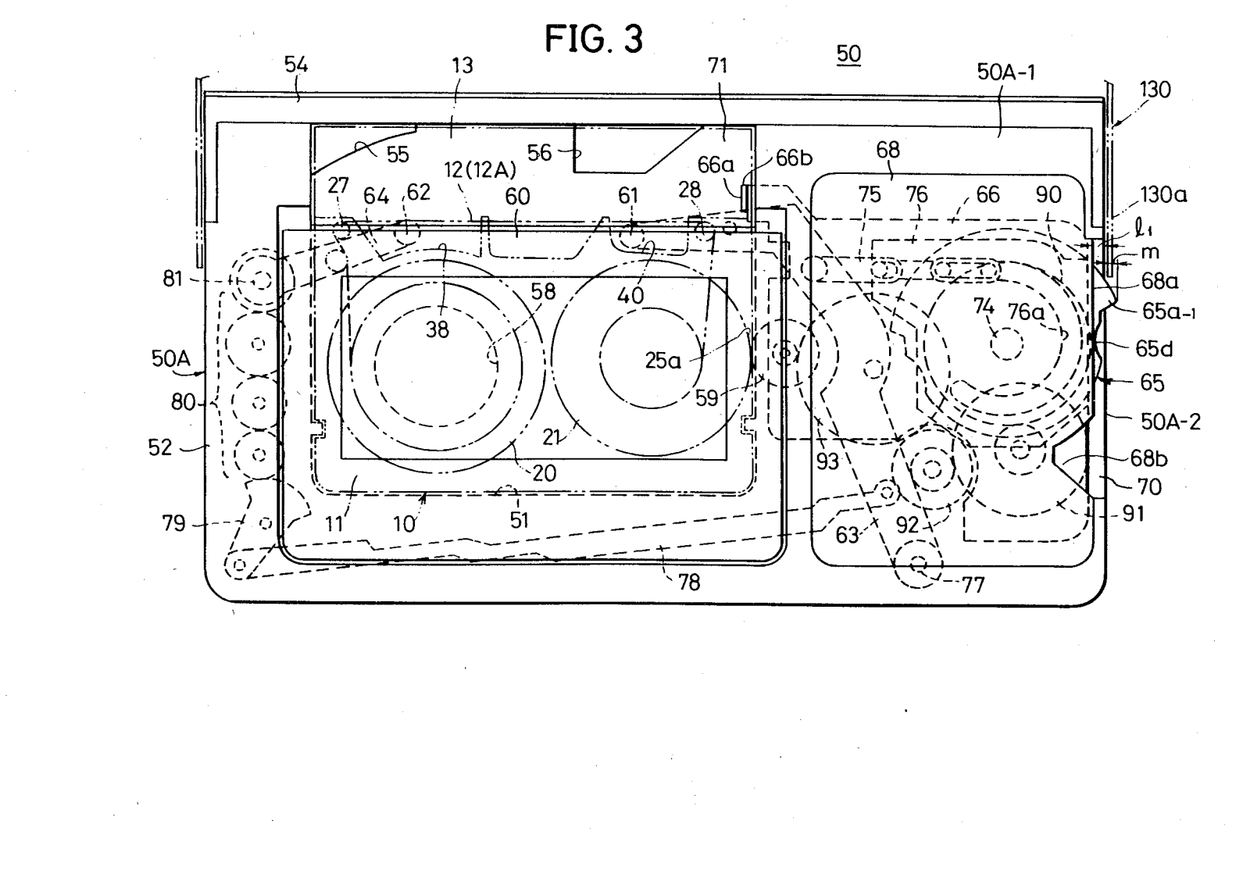
FIGS. 3 and 4 are a plan view and a side view respectively showing an embodiment of an adapter for a miniature type tape cassette according to the present invention.
Figure 4:
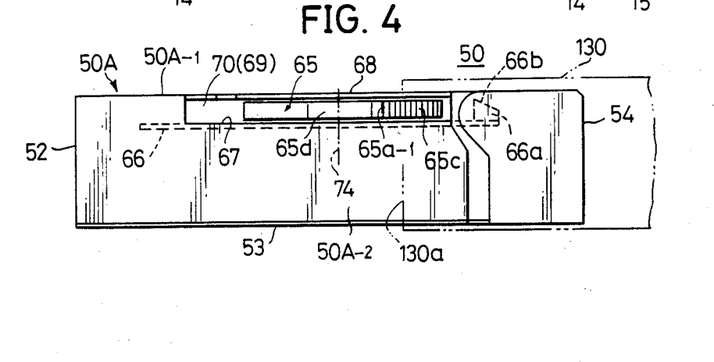

In addition, a supply reel 20 and a take-up reel 21 are provided side by side within the cassette case 11 as shown in FIG. 3. The supply reel 20 is provided in a state where an annular projecting step portion 22 of a lower flange is loosely fitted into a hole 23 having a large diameter in the lower half 15. The take-up reel 21 is provided in a rotatable manner in such a manner that a fixed shaft embedded in the lower half 15 by a screw 24, is inserted into a center hole of a reel hub. A part of a gear 25a formed at the periphery of a lower flange 25 of the take-up reel 21, is exposed through a cutout window 26 provided in the lower half 15. The tape 12 is guided by poles 27 and 28, for forms a tape path 12A along the front of the cassette case 11.

Next, description will be given with respect to an embodiment of the adapter for a miniature type tape cassette according to the present invention, for a case where the adapter is loaded into the standard type recording and/or reproducing apparatus in a state accommodating the tape cassette 10 having the above described construction, by referring to FIGS. 3 through 11.

An adapter 50 has an accommodating part 51 for accommodating the tape cassette 10 within an adapter case 50A as shown in FIG. 3, and the adapter case 50A has an external form and size substantially equal to those of the standard type tape cassette. The adapter case 50A consists of a case body 52 having a top plate part and side wall parts, a bottom plate 53, and a lid 54. The lid 54 is free to open and close, and is provided at the front of the adapter case 50A. As will be described hereinafter, the lid 54 protects the tape 12 which forms a predetermined tape path within the adapter 50.

Figure 11:
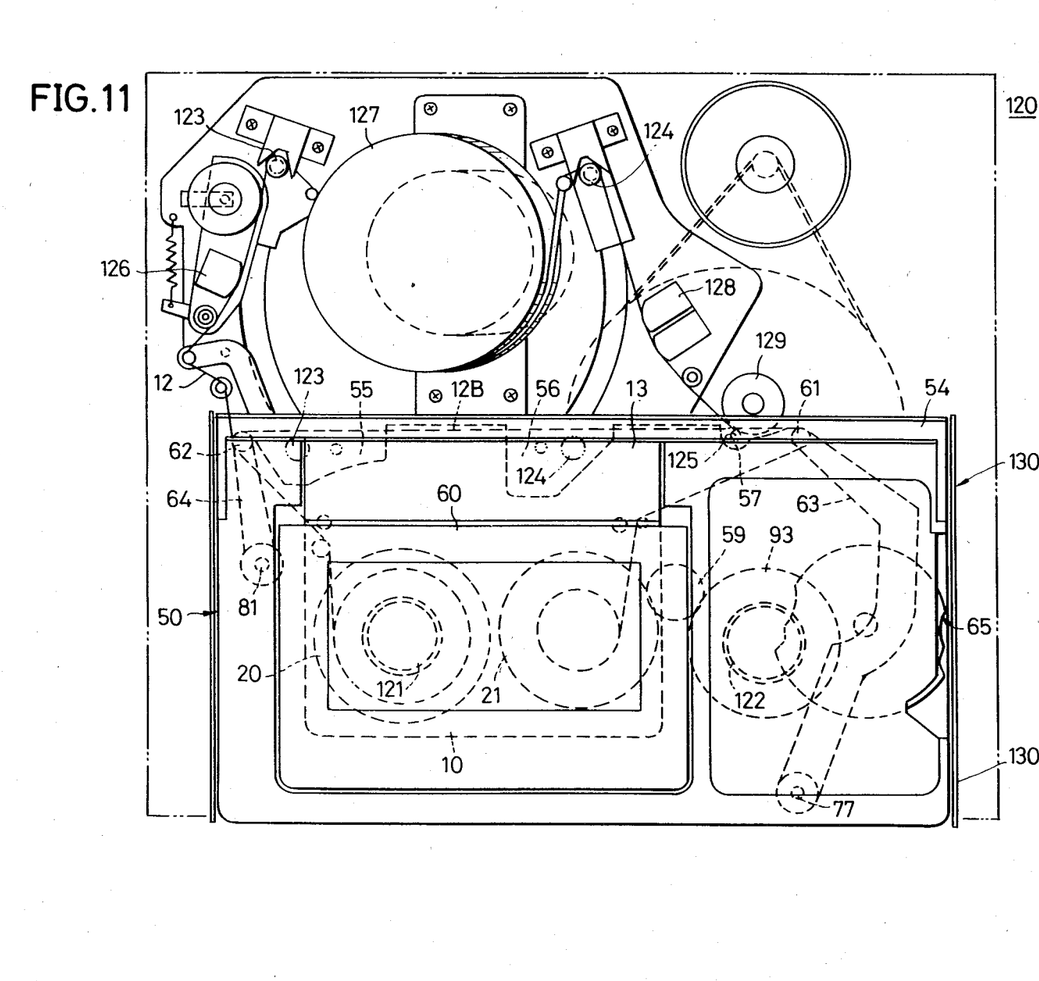
FIG. 11 is a plan view showing an example of a standard type recording and/or reproducing apparatus loaded with the adapter shown in FIG. 3, in a state where the miniature type tape cassette shown in FIG. 1 is accommodated within the adapter and a predetermined tape path is formed within the adapter case, during a recording or reproducing mode of the recording and/or reproducing apparatus.

A tape draw-out mechanism for drawing out the tape 12 is provided within the adapter case 50A. Cutouts 55 and 56 into which loading poles enter, and a cutout 57 into which a capstan enters, are respectively provided at the front of the bottom plate 53 as shown in FIG. 11.

The accommodating part 51 is formed as a depression having an opening at the upper part thereof. A reel driving shaft inserting hole 58 is provided on the bottom part of the accommodating part 51. Furthermore, a reel driving gear 59 partly projects into the accommodating part 51 from a side of the accommodating part 51. The opening at the upper part of the accommodating part 51 is covered by a cover 60 which may be opened or closed.

Poles (or rollers) 61 and 62 for drawing out and guiding the tape are respectively embedded at the ends of a first loading arm 63 and a second loading arm 64. These poles 61 and 62 move between positions indicated in FIG. 3 before the tape is drawn out, and positions indicated in FIG. 9 after the operation of drawing out the tape is completed. Before the tape is drawn out, the poles 61 and 62 are positioned within the accommodating part 51, and assume positions opposing cutouts 40 and 38 of the tape cassette 10 which is accommodated within the adapter 50. After the operation of drawing out the tape is completed, the poles 61 and 62 respectively assume positions corresponding to positions of right and left tape guide poles provided at the front of the standard type tape cassette, to guide the tape. The poles 61 and 62 simultaneously move between the above two positions, by rotationally manipulating a rotary manipulation knob 65 provided at the right side of the adapter case 50A about a shaft 74 by the operator's finger tips.

Figure 6A:
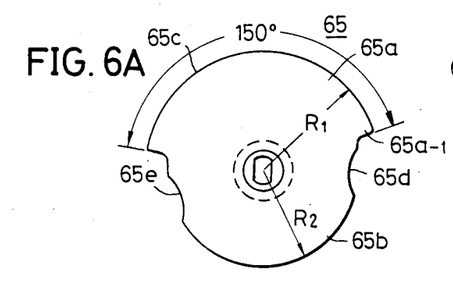
FIGS. 6A, 6B, and 6C are a plan view, a side view, and a bottom view, respectively showing the rotary manipulation knob.
Figure 6B:
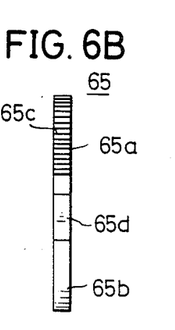
Figure 6C:
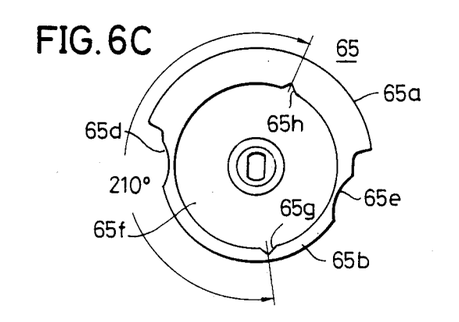

As shown in FIGS. 6A, 6B, and 6C, the rotary manipulation knob 65 is a disc-shaped member comprising a fan-shaped part 65a of a large radius R1 and a fan-shaped part 65b of a small radius R2, where R1 is greater than R2. The fan-shaped part 65a extends over an angular range of 150°. The operator's finger tips make contact with a peripheral surface 65c of the fan-shaped part 65a upon manipulation of the knob 65, and knurls are formed on the peripheral surface 65c so as to prevent slippage. In addition, arcuate grooves 65d and 65e corresponding to the operator's finger tips are formed on a peripheral surface of the fan-shaped part 65b near both ends thereof, so that the knob 65 can easily be manipulated by the operator's finger tips at the initial stage of the manipulation. A flat columnar depression 65f is formed on the bottom surface of the knob 65, and a pair of dents 65g and 65h which engage with detents are formed on the inner peripheral surface of the depression 65f. The dents 65g and 65h are separated by an angle of 210°. As will be described hereinafter, the fan-shaped part 65a prevents loading of the adapter 50 into the standard type recording and/or reproducing apparatus if the predetermined tape path is not formed within the adapter 50.

The knob 65 and a base member 66 which supports a gear mechanism which will be described hereinafter, are fixed to the adapter case 50A by screws at a height position close to a top plate 50A-1 of the adapter 50. A flat depression 67 is formed in continuous with the base member 66 on the case body 52 which constitutes the adapter case 50A, and extends to a right side wall 50A-2 of the adapter case 50A (case body 52). An opening above the flat depression 67 is covered by a panel 68. A right end edge 68a of this panel 68 is separated by a distance 11 from a plane in which the right side wall 50A-2 of the adapter case 50A lies. Further, a substantially V-shaped cutout 68b which opens with respect to the right end edge 68a, is formed in the panel 68.

Accordingly, a flat space 69 is formed in the adapter case 50a at a position closer to the top plate 50A-1, wherein an opening 70 is formed at a corner part between the top plate 50A-1 and the right side wall 50A-2. The rotary manipulation knob 65 is arranged within this flat space 69 in a state where a part of the knob 65 projects within the opening 70, and is exposed. Hence, the knob 65 may be rotationally manipulated from the opening 70 by the operator's finger tips. The opening 70 does not have a cover.

A bent piece 66a for opening the lid 13 of the tape cassette 10 and maintaining the lid 13 in the open state is formed on the base member 66 by bending a part of the base member 66 upwards. As shown in FIG. 3, the piece 66a is provided at a position on the right side of an opening 71 of the adapter 50. In addition, an upper surface 66b of the piece 66a is formed as a smooth sloping surface which slopes downwards towards the lid 54 of the adapter 50.

Next, description will be given with respect to the operation in which the tape cassette 10 is accommodated within the accommodating part 51 of the adapter 50, to form the predetermined tape path within the adapter 50.

Figure 7:
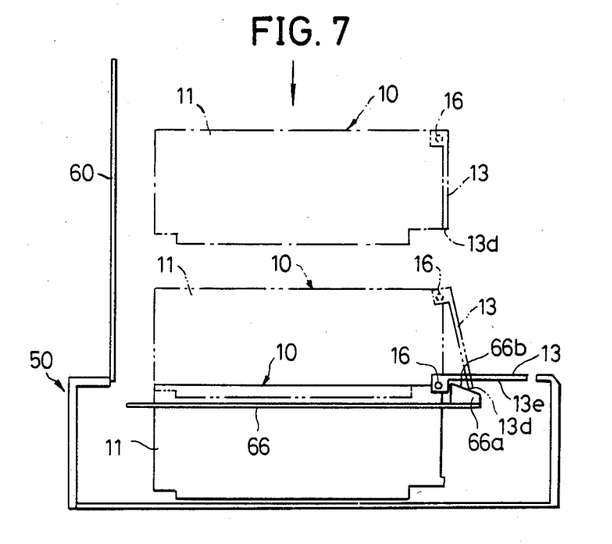
FIG. 7 is a diagram for explaining how a lid of the miniature type tape cassette opens in the process of accommodating the miniature type tape cassette within the adapter shown in FIG. 3.

When accommodating the tape cassette 10 within the adapter 50, the cover 60 covering the top of the accommodating part 51 of the adapter 50 is opened as shown in FIG. 7. The tape cassette 10 is accommodated within the accommodating part 51, in a state where the lid 13 is closed as shown by a one-dot chain line in FIG. 7, by pushing down the tape cassette 10 into the accommodating part 51 of the adapter 50 in the direction of an arrow. The tape cassette 10 is accommodated facing a predetermined direction, by fitting grooves provided on the side of the tape cassette over corresponding projecting ribs provided at the accommodating part 51. By the above operation to accommodate the tape cassette 10 within the adapter 50, the poles 61 and 62 are respectively and relatively inserted into the cutouts 40 and 38 of the tape cassette 10 on the inner side of the tape path 12A, so as to oppose the tape path 12A. Moreover, a gear teeth 27a meshes with the gear 59. After the tape cassette 10 is accommodated within the accommodating part 51, the cover 60 covering the top of the accommodating part 51 is closed so as to cover the top of the accommodated cassette case 11.

When accommodating the tape cassette 10 within the accommodating part 51, a lower edge 13d of the lid 13 makes contact with the piece 66a of the base member 66. Thus, the lid 13 is guided by the sloping surface 66b of the piece 66a, and rotates towards the opening direction as indicated by a two-dot chain line in FIG. 7 as the operation to accommodate the tape cassette 10 within the accommodating part 51 advances. In a state where the cassette case 11 is completely accommodated within the accommodating part 51 as indicated by a solid line in FIG. 7, the lid 13 rotates to a horizontal position indicated by a solid line in FIG. 13 and assumes the open state in a click-stop manner. That is, the lid 13 is closed when accommodating the tape cassette 10 within the accommodating part 51, but the lid 13 is automatically opened while this accommodating operation is being carried out. For this reason, the tape cassette 10 can be accommodated within the accommodating part 51 of the adapter 50 without the danger of the tape 12 being scratched and damaged during the accommodating operation.

In the state where the tape cassette 10 is accommodated within the adapter 50, the top surface of the lid 13 coincides with the upper surface of the adapter case 50A, and covers the opening 71. The piece 66a is slightly separated from and opposes a lower surface 13e of the lid 13. Accordingly, when thereafter handling the adapter or loading the adapter into the recording and/or reproducing apparatus, for example, the lid 13 is prevented from closing by the piece 66a even if an external force acts on the lid 13 towards the closing direction of the lid 13. That is, the lid 13 is prevented from closing by the piece 66a, and is maintained in its open state.

Figure 8:
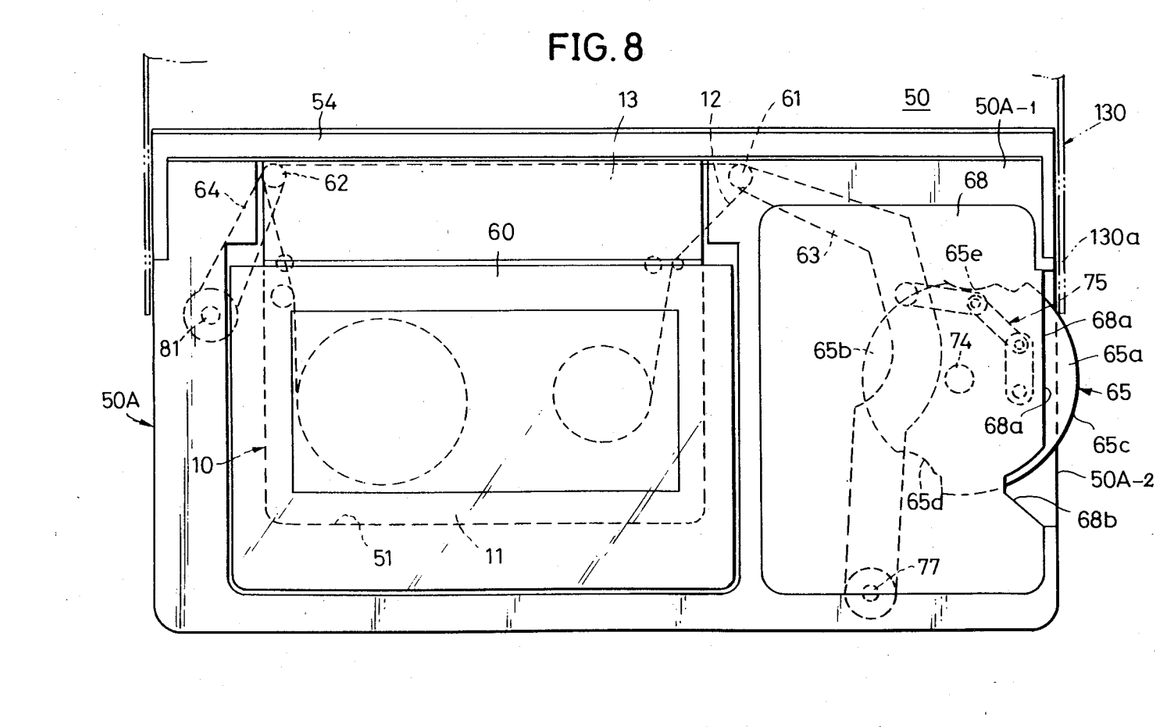
FIGS. 8 and 9 are plan views showing the adapter in a state where the rotary manipulation knob is manipulated halfway and in a state where the rotary manipulation knob is rotationally manipulated to a final position.
Figure 9:
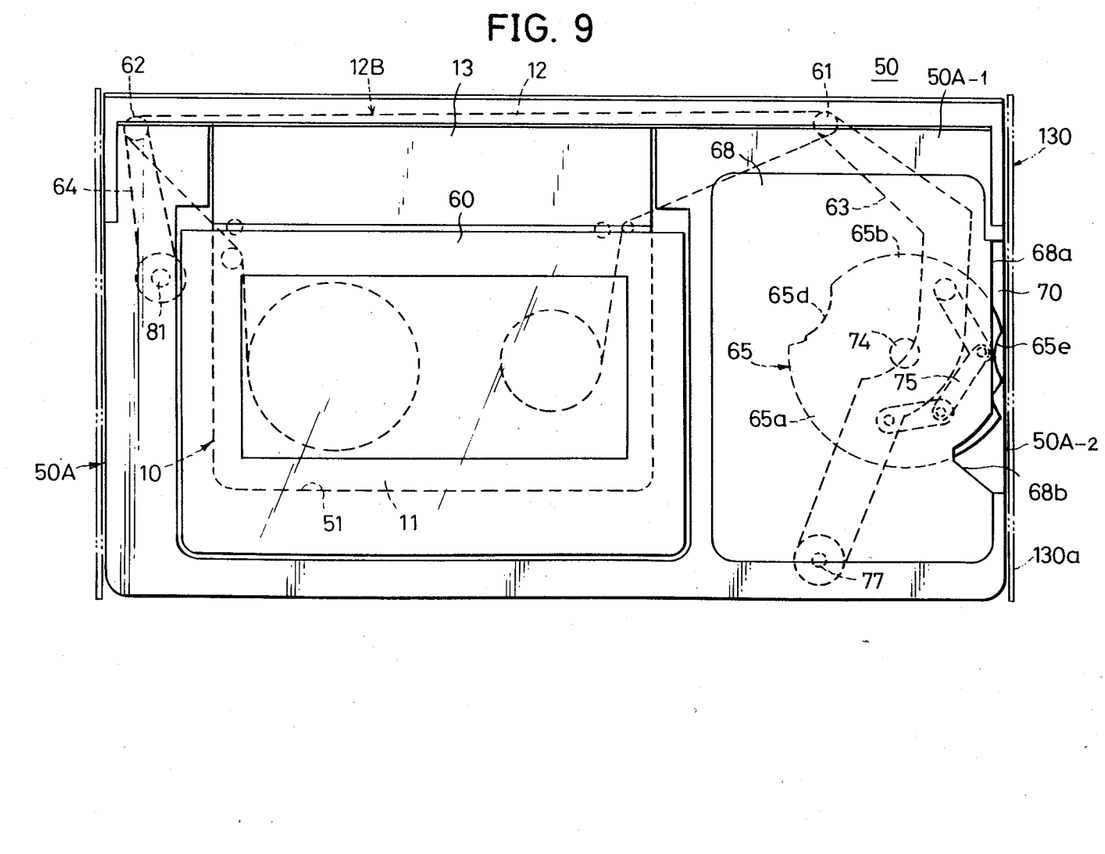
Figure 10:
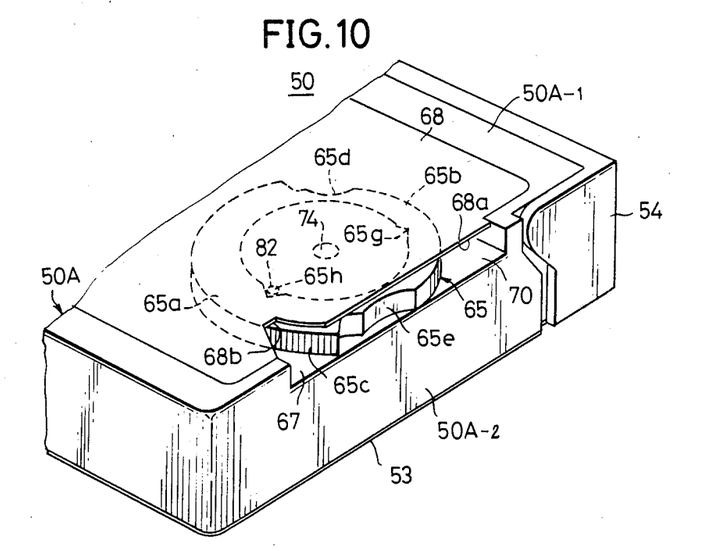
FIG. 10 is a perspective view showing a projecting state of the rotary manipulation knob with respect to the opening of the adapter case after the manipulation of the rotary manipulation knob is completed.

In this state where the tape cassette 10 is accommodated within the adapter 50, the rotary manipulation knob 65 is rotationally manipulated clockwise through a state shown in FIG. 8 to the final position shown in FIGS. 9 and 10. The manipulation of the knob 65 is carried out by repeating an operation in which the operator puts the tip of his right index finger at the opening 70 while holding the adapter 50, places his finger tip on the surface 65c provided with knurls of the fan-shaped part 65a of the knob 65, and rotates the knob 65 clockwise by drawing the surface 65c towards him. Such an operation in which the knob 65 is rotated, may be carried out smoothly with ease. On the other hand, the operator may place his finger tip on the arcuate grooves 65d and push the arcuate groove 65d towards the rear of the adapter case 50A in order to rotate the knob 65. When the knob 65 is rotated clockwise, the tape 12 is drawn out of the tape cassette 10 to form a predetermined tape path 12B within the adapter case 50A.

When the knob 65 is rotationally manipulated clockwise, a special chain 75 comprising three interconnected links moves along a J-shaped guide groove 76a of a plate 76. The first loading arm 63 is pulled by the chain 75 and rotates clockwise about a shaft 77 up to a position shown in FIG. 9 by way of an intermediate position shown in FIG. 8. This rotation of the first loading arm 63 is transmitted to the second loading arm 64 by way of a link 78, a fan-shaped gear 79, and a series of gear wheels 80. Accordingly, the second loading arm 64 is rotated counterclockwise about a shaft 81 up to a position shown in FIG. 9 by way of an intermediate position shown in FIG. 8.

By the rotation of the first and second loading arms 63 and 64, the poles 61 and 62 intercept and engage with the tape 12 to draw the tape 12 out of the tape cassette 10. These poles 61 and 62 reach positions shown in FIG. 9 whereat the operation of drawing out the tape 12 is completed. The tape 12 is drawn out from the reels 21 and 22 of the tape cassette 10, to form the predetermined tape path 12B, guided by the poles 61 and 62, as shown in FIG. 9. The positions of the poles 61 and 62 whereat the operation of drawing out the tape 12 is completed, correspond to positions of right and left guide poles provided at the front of the standard type tape cassette. In addition, the tape path 12B which is formed by the guidance provided by the poles 61 and 62 becomes identical to the tape path formed at the front of the standard type tape cassette. When the adapter 50 is used, the poles 61 and 62 act as guides to guide the tape 12.

As shown in FIG. 10, a ball 82 engages with the dent 65h, and the knob 65 is positively locked in the final rotational position in a click-stop manner.

As shown in FIG. 11, the adapter 50 is inserted within a cassette housing 130, and loaded into a standard type recording and/or reproducing apparatus 120 in the same manner as the standard type tape cassette.

That is, by loading the adapter 50, a supply reel driving shaft 121 is inserted into a reel driving shaft inserting part of the supply reel 20 of the tape cassette 10. On the other hand, a take-up reel driving shaft 122 is inserted into a reel driving shaft inserting part of a gear 93 within the adapter 50. In addition, loading poles 123 and 124 and a capstan 125 respectively enter into the cutouts 55, 56, and 57.

Upon a tape loading operation, the above loading poles 123 and 124 respectively intercept and engage with the tape 12, then draw the tape 12 out of the adapter 50, and reach positions indicated by solid lines in FIG. 11. Accordingly, the tape 12 which is drawn outside the adapter 50, makes contact with a full-width erasing head 126, and makes contact with a guide drum 127 provided with rotary video heads over a predetermined angular range. The tape 12 further makes contact with an audio and control head 128. Therefore, the above tape 12 is loaded onto a predetermined tape path. The tape 12 is driven in a state pinched between the capstan 125 and a pinch roller 129. Moreover, the gear 93 within the adapter 50 is rotated clockwise by the take-up reel driving shaft 122. This rotation of the gear 93 is transmitted to the take-up reel 21 through the gear 59, to drive the tape 12 towards a tape take-up direction. Accordingly, the tape 12 fed out by the capstan 125 is taken up by the take-up reel 21. The tape 12 is guided by the pole 62 at the exit part of the adapter 50, and guided by the pole 61 at the entrance part of the adapter 50.

Figure 5:
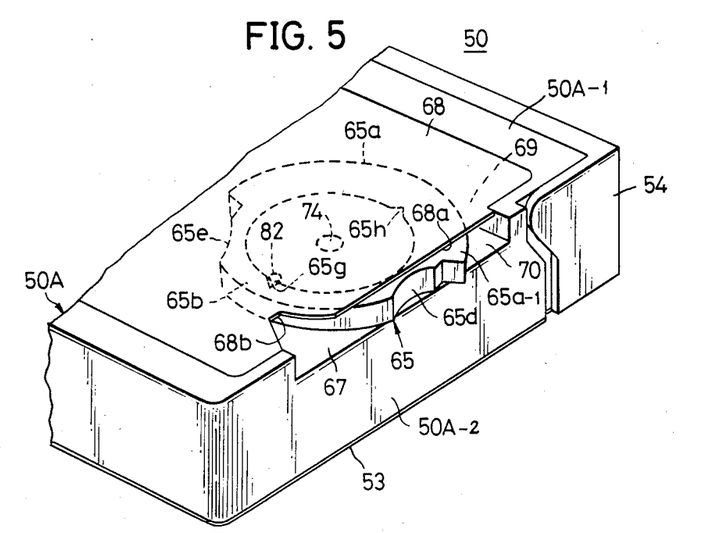
FIG. 5 is a perspective view showing a projecting state of a rotary manipulation knob with respect to an opening of an adapter case before the rotary manipulation knob is manipulated.

When extracting the tape cassette 10 from the adapter 50 which is obtained outside of the standard type recording and/or reproducing apparatus 120, the rotary manipulation knob 65 is rotated counterclockwise to the original position. The knob 65 does not project from the right side wall 50A-2 of the adapter case 50A to be manipulated. However, the knob 65 will start to rotate counterclockwise with ease by inserting the finger tip within the V-shaped cutout 68b of the panel 68 and pushing the peripheral surface 65c towards the lid 54, or by placing the finger tip at the arcuate groove 65e exposed at the opening 70 and pushing the arcuate groove 65e towards the lid 54. Thereafter, the knob 65 may be rotationally manipulated by use or the peripheral surface 65c which becomes exposed at the opening 70. As shown in FIG. 5, the ball 82 fits into the dents 65g and the knob 65 becomes locked in a click-stop manner.

By the manipulation of the knob 65 in particular, the loading arms 63 and 64 respectively rotate counterclockwise and clockwise by way of the intermediate positions shown in FIG. 8 up to the positions shown in FIG. 3. Moreover, the poles 61 and 62 respectively return into the cutouts 40 and 38 of the tape cassette 10 which is accommodated within the accommodating part 51.

In addition, by the above manipulation of the knob 65, the rotation of a gear 90 which rotates unitarily with the knob 65, is transmitted to the take-up reel 21 within the tape cassette 10 through gears 91, 92, and 93 and the reel driving gear 59. As a result, the take-up reel 21 rotates, and the tape 12 which was drawn outside the tape cassette 10 is taken up by the take-up reel 21.

Hence, by the manipulation of the knob 65, the entire tape 12 drawn outside the tape cassette 10 is retracted into the tape cassette 10. Thus, the tape cassette 10 can be extracted from the accommodating part 51 by pushing the bottom of the tape cassette 10 upwards.

However, in a state before the knob 65 is manipulated, the knob 65 assumes the rotational position shown in FIGS. 3 and 5. That is, a corner 65a-1 at the arcuate groove 65d of the fan-shaped part 65a projects from the right side wall 50A-2 of the adapter case 50A by a distance m. Thus, if an attempt is made to load the adapter 50 into the standard type recording and/or reproducing apparatus 120 by inserting the adapter 50 into the cassette housing 130 in a state where the tape cassette 10 is simply accommodated within the adapter and the knob 65 has not been manipulated, the projecting corner 65a-1 hits the edge of a side wall 130a of the cassette housing 130 indicated by a two-dot chain line in FIGS. 3 and 4 during the process of inserting the adapter 50 into the cassette housing 130. That is, the adapter 50 is prevented from being inserted into the cassette housing 130. Accordingly, it is possible to prevent erroneous loading of the adapter 50 into the recording and/or reproducing apparatus 120 in a state where the tape cassette 10 is simply accommodated within the adapter 50 and the knob 65 has not been manipulated, and therefore prevent the tape loading operation from being carried out in a state where the tape 12 cannot be intercepted and engaged for loading. As a result, a situation will not occur wherein the adapter 50 is loaded into the recording and/or reproducing apparatus 120 but the recording and/or reproducing operation cannot be carried out because the tape cassette 10 is simply accommodated within the adapter 50 and the knob 65 has not been manipulated.

The corner 65a-1 of the fan-shaped part 65a projects from the side wall 50A-2 at a position deviated towards the lid 54 from a center line along the longitudinal direction of the adapter case 50A. Hence, the corner 65a-1 will hit the edge of the side wall 130a of the cassette housing 130 upon insertion of the adapter 50 into the cassette housing 130, and enables the operator to realize that the adapter 50 is being inserted erroneously at the initial stage of the insertion.

When the knob 65 is rotationally manipulated clockwise, the fan-shaped part 65a within the space 69 projects into the opening 70. In a state where the knob 65 is rotationally manipulated halfway, the fan-shaped part 65a projects in the form of an arc from the right side wall 50A-2 of the adapter case 50A as shown in FIG. 8. Hence, if an attempt is made to insert the adapter 50 into the cassette housing 130 in this state where the knob 65 is manipulated halfway, the projecting fan-shaped part 65a hits the edge of the side wall 130a of the cassette housing 130 in a manner similar to that described before, and the adapter 50 cannot be inserted into the cassette housing 130. Accordingly, accidents which may occur if the adapter case 50 is inserted into the cassette housing 130 in the state where the knob 65 is manipulated halfway, is positively prevented from occurring. That is, an accident in which the tape loading operation is carried out within the adapter 50 in a state where the tape 12 cannot be intercepted and engaged for loading, or an accident in which the tape 12 is bent and damaged when the lower edge of the tape 12 hits the poles 61 and 62 upon insertion of the adapter 50 into the cassette housing 130, is prevented from occurring.

When the knob 65 is rotationally manipulated up to the position where the tape path 12B is formed within the adapter 50, the fan-shaped part 65a passes by the opening 70 and enters within the space 69 as shown in FIGS. 9 and 10. In this state, the fan-shaped part 65b projects into the opening 70, and the knob 65 does not project from the right side wall 50A-2 of the adapter case 50A. That is, the entire knob 65 is receded within the adapter case 50A. Hence, in this state, the adapter 50 assumes an external form substantially the same as that of the standard type tape cassette, and the adapter 50 can be inserted normally into the cassette housing 130 without hitting the side wall 130a of the cassette housing 130 and accordingly loaded into the recording and/or reproducing apparatus 120 as shown in FIG. 11.

In a case where the standard type recording and/or reproducing apparatus 120 comprises a so-called front-loading mechanism for enabling the standard type tape cassette or the adapter 50 to be loaded through an inserting opening provided at the front panel of the recording and/or reproducing apparatus 120, the erroneous insertion of the adapter 50 can be prevented in a manner similar to that described before. In this case, the erroneous insertion of the adapter 50 into the recording and/or reproducing apparatus 120 is prevented when the fan-shaped part 65a of the knob 65 hits the edge of the above inserting opening provided at the front panel of the recording and/or reproducing apparatus 120.

In the embodiment described heretofore, the adapter 50 is designed so that a part of the rotary manipulation knob 65 projects from the right side wall 50A-2 of the adapter case 50A if the knob 65 is not manipulated or only manipulated halfway, however, the present invention is not limited to the embodiment described heretofore. For example, the knob 65 may be arranged at a different position on the adapter case 50A so that the knob 65 projects from the left side wall, the top plate 50A-1, or the bottom plate 53, when the knob 65 is not manipulated or only manipulated halfway. In such cases, the erroneous insertion of the adapter 50 into the cassette housing 130 can be prevented in a manner similar to that described before.

Further, the present invention is not limited to these embodiments, but various variations and modifications may be made without departing from the scope of the present invention.

What is claimed is:

1. An adapter for a miniature type tape cassette having an external form and size smaller than those of a standard type tape cassette, said miniature type tape cassette being used with a recording and/or reproducing apparatus of a type different from a standard type recording and/or reproducing apparatus primarily designed for carrying out recording and/or reproduction with said standard type tape cassette, said standard type recording and/or reproducing apparatus comprising an inserting part into which said standard type tape cassette or said adapter is inserted, said miniature type tape cassette comprising a cassette case smaller than said standard type tape cassette, and a tape accommodated within said cassette case and forming a tape path along a front of said cassette case when said miniature type tape cassette is not in use, said adapter comprising:

an adapter case having an external form and size substantially identical to those of said standard type tape cassette;
an accommodating part for accommodating said miniature type tape cassette; and
tape draw-out means provided within said adapter case, for drawing out the tape from said miniature type tape cassette so as to form a predetermined tape path within said adapter case;
said tape draw-out means comprising tape draw-out members relatively entering on an inner side of the tape path along the front of said cassette case when accommodating said miniature type tape cassette within said accommodating part, and a manipulation part for operating said tape draw-out members so as to form said predetermined tape path within said adapter,
said manipulation part projecting outside said adapter case to such an extent that said manipulation part hits said inserting part of said standard type recording and/or reproducing apparatus and prevents insertion of said adapter into said inserting part before and during manipulation of said manipulation part, and receding within said adapter case to permit insertion of said adapter through said inserting part after manipulation of said manipulation part is completed.

2. An adapter as claimed in claim 1 in which said manipulation part comprises a rotary member having a large diameter part projecting outside said adapter case according to a rotational position of said rotary member, and said rotary member assumes a rotational position where said large diameter part projects outside said adapter case before and during manipulation of said rotary member, and assumes a rotational position where said large diameter part recedes within said adapter case after manipulation of said rotary member is completed.

3. An adapter as claimed in claim 1 in which said adapter comprises an opening at a corner part defined by a top plate thereof and a side wall thereof along an inserting direction towards which said adapter is inserted into said inserting part of said standard type recording and/or reproducing apparatus, said manipulation part comprises a rotary member provided freely rotatable at the opening of said adapter case, said rotary member has a large diameter part, and said rotary member assumes a rotational position where said large diameter part projects outside said adapter case through said opening and exceeds the side wall of said adapter case before and during manipulation of said rotary member, and assumes a rotational position where said large diameter part recedes to an inner side of the side wall of said adapter case after manipulation of said rotary member is completed.

4. An adapter as claimed in claim 3 in which said rotary member is arranged at such a position that said large diameter part projects outside said adapter case by exceeding the side wall of said adapter case at a position closer to the front of said adapter case.

5. An adapter as claimed in claim 3 in which said adapter case comprises a cutout formed in a top plate thereof at a position opposing said large diameter part in a state where the manipulation of said rotary member is completed, so that an operator's finger tip may be placed at said large diameter part of said rotary member in the state where the manipulation of said rotary member is completed.

6. An adapter as claimed in claim 3 in which said rotary member further comprises a small diameter part which projects within said opening without exceeding the side wall of said adapter case, knurls forming a peripheral surface of said large diameter part for preventing slippage, and grooves formed in said small diameter part, and said grooves are formed at positions where an operator's finger may be placed at said grooves at said opening before manipulation of said rotary member and after the manipulation of said rotary member is completed.

7. An adapter as claimed in claim 1 in which said miniature type tape cassette further comprises a lid provided freely rotatable to open and close at the front of said cassette case, for covering the tape at said tape path along the front of said cassette case, and said adapter case comprises a lid-opening mechanism for opening said lid of said miniature type tape cassette during a process in which said miniature type tape cassette with its lid closed is accommodated within said accommodating part.

8. An adapter as claimed in claim 7 in which said lid-opening mechanism comprises a lid-opening member which is fixedly provided opposing a lower edge of said lid of said miniature type tape cassette, for guiding and opening said lid of said miniature type tape cassette which is pushed downwards to be accommodated within said accommodating part, and said lid-opening member holds a rear surface of the open lid when accommodation of said miniature type tape cassette is completed to maintain said open lid in its open state.

* * * * *